ര
United States Patent
Jeraj et al.

(10) Patent No.: US 10,445,878 B2
(45) Date of Patent: Oct. 15, 2019

(54) IMAGE ENHANCEMENT SYSTEM FOR BONE DISEASE EVALUATION

(71) Applicant: Wisconsin Alumni Research Foundation, Madison, WI (US)

(72) Inventors: Robert Jeraj, Madison, WI (US); Tyler Bradshaw, Madison, WI (US); Timothy Perk, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 322 days.

(21) Appl. No.: 15/590,548

(22) Filed: May 9, 2017

(65) Prior Publication Data

US 2018/0330495 A1 Nov. 15, 2018

(51) Int. Cl.
*G06K 9/00* (2006.01)
*G06T 7/00* (2017.01)
*G06T 5/00* (2006.01)

(52) U.S. Cl.
CPC ............ *G06T 7/0012* (2013.01); *G06T 5/008* (2013.01); *G06T 2207/10072* (2013.01); *G06T 2207/20012* (2013.01); *G06T 2207/30008* (2013.01); *G06T 2207/30096* (2013.01)

(58) Field of Classification Search
CPC ................... G06T 5/008; G06T 7/0012; G06T 2207/10081; G06T 11/006; G06T 7/0081; G06T 7/0085; G06T 7/60; G06T 2207/10116; G06T 2207/30004; G06T 5/40; G06T 2207/30068; G06T 1/20; G06T 17/20; G06T 1/60; A61B 6/032; A61B 5/02007; A61B 5/7264; A61B 5/742; G06K 9/4604; G06K 9/52; G06K 9/6267; G06K 9/66; G06F 9/5044; G06F 17/5018; G06F 2217/16

See application file for complete search history.

(56) References Cited

U.S. PATENT DOCUMENTS

| 9,161,720 B2 | 10/2015 | Jeraj et al. | |
| 2007/0015995 A1* | 1/2007 | Lang | A61B 5/055 600/407 |
| 2015/0178918 A1* | 6/2015 | Arnaud | G06T 7/0012 382/131 |

OTHER PUBLICATIONS

Eric M. Rohern et al. "Determinatron of skeletal tumor burden on 18F-fluoride PET/CT." Journal of Nuclear Medicine 56, No. 10 : pp. 1-33, Jul. 1, 2015: US.

(Continued)

*Primary Examiner* — Duy M Dang
(74) *Attorney, Agent, or Firm* — Boyle Fredrickson, S.C.

(57) ABSTRACT

A standardized skeleton template is used to normalize medical image data of the skeleton to eliminate variations in the medical image data related to physiological variations in a normal patient thereby better accentuating disease conditions.

20 Claims, 4 Drawing Sheets

(56) References Cited

OTHER PUBLICATIONS

Agnes Araujo Valadares et al.; "Receiver operating characteristic (ROC) curve for classification of18F-NaF uptake on PET/CT." Radiologia brasileira 49, No. 1 (Jan. 2016) pp. 12-16; US.

Nazli Sarkalkan et al.;"Statistical shape and appearance models of bones."; Bone 60 (2014): pp. 129-140; US.

Hara et al.; "Quantitative analysis of torso FDG-PET scans by using anatomical standardization of normal cases from thorough physical examinations." PloS one 10, No. 5 (May 2015): e0125713.; pp. 1-16; United Kingdom.

Van Der Sluis et al.; "Reference data for bone density and body composition measured with dual energy x ray absorptiometry in white children and young adults." Archives of disease in childhood 87, No. 4 (2002): 341-347.; US.

\* cited by examiner

IMAGE ENHANCEMENT SYSTEM FOR BONE DISEASE EVALUATION

STATEMENT REGARDING FEDERALLY SPONSORED RESEARCH OR DEVELOPMENT

- -

CROSS REFERENCE TO RELATED APPLICATION

- -

BACKGROUND OF THE INVENTION

The present invention relates to medical imaging systems, and in particular, to an imaging system enhancing bone images by removing normal variations based on standardized bone templates.

In the identification of skeletal diseases, a patient may be imaged, for example using: positron emission tomography (PET), computed tomography (CT), magnetic resonance imaging (MRI), or single photon emission tomography (SPECT) to detect the abnormal image intensity and hence the presence bone disease.

In the identification of some skeletal diseases, such as metastasized caner lesions, a patient may be given a radioactive tracer preferentially localizing in lesions. An image of the tracer, such as $^{18}F$—NaF, may be taken casing an imaging system such as PET/CT imaging, to detect the increased presence of the tracer and hence the presence of disease in different portions of the patient.

An accurate assessment of disease is critical for evaluating the efficacy of a particular cancer treatment regime. In particular, detection and quantification of lesions in early treatment steps are critical in guiding the physician.

The selectivity of the image intensity for cancerous lesions is imperfect and for that reason the physician must analyze the images to distinguish image intensity indicating true lesions from background noise in healthy tissue. In analyzing lesions in the skeleton, this process is complicated by the fact that different hones have different background intensities independent of disease. Accordingly, the physician must mentally discount some image regions while applying greater weight to image intensity in other image regions. This inability to rely directly on the image for the identification of disease adds to the burden of the physician in reading these images potentially increasing the opportunity for error. In addition, these image variations may interfere with quantitative measurements applied to the image.

SUMMARY OF THE INVENTION

The present invention provides an image enhancement system for bone disease diagnosis, which corrects the images to account for normal variations in different bones with respect to the uptake of a specific tracer or specific image modality. The result is a normalized image that better reveals disease location, reducing subjective interpretation.

The invention uses a standard skeleton template to reduce image features that relate to normal physiology thereby accentuating image features related to disease. In one embodiment, the inventors have analyzed multiple "healthy" individuals with respect to radioactive tracer uptake to establish multiple, skeletal, anatomy-dependent background signal thresholds. These background values can serve to statistically select to best thresholds to identify lesions in different skeletal regions. These thresholds are then applied to corresponding skeletal regions in the image data by registration of the skeleton template holding these thresholds to the patient data. The result is a normalized image that may be more easily analyzed by the physician having had standard variations removed so that only disease-based differences are evident. This improved image may be used for improved automatic analysis of lesion size, location, and change.

Specifically then, one embodiment of the invention provides a medical imaging system including patient image data storage (holding patient image data of a skeletal structure of a patient), the patient image data describing points in space linked to properties of bone of the skeletal structure at those points, and template skeleton data storage (holding template image data corresponding anatomically to the patient skeletal structure), the template image data describing points in space linked to parameters related to the property of bone of the skeletal structure of a composite patient having predefined characteristics. An electronic computer executes a stored program to; (a) register the template image data to the patient image data according to anatomical correspondence; (b) modify the patient image data using the template image data to accentuate features in the patient image data reflecting differences between the skeletal structure of the patient and the skeletal structure of the composite patient; and (c) display the modified patient image data accentuating differences between the skeletal structure of the patient and the skeletal structure of the composite patient having predetermined characteristics.

It is thus a feature of at least one embodiment of the invention to remove the effects of normal skeletal variation in the analysis of bone images to provide improved lesion identification and diagnosis.

The properties of the patient image data may be measures of radioactive tracer uptake and the parameters of the template image data may be differences in the uptake rate of radioactive tracers in the skeleton.

It is thus a feature of at least one embodiment of the invention to remove the effect of different uptake rates associated with different bones of the skeleton from measures of uptake used to identify tumors.

The different bones of the skeletal structure of the composite patient may provide different parameter values.

It is thus a feature of at least one embodiment of the invention to permit variations among different bones of a normal human to be successfully captured and modeled.

The template image data may provide at least ten different parameter values.

It is thus a feature of at least one embodiment of the invention to permit a level of normalization to variations in the human body beyond that reasonably possible by a physician.

The electronic computer may further operate the stored program to identify at least one of number and size of lesions in the modified patient image data base.

It is thus a feature of at least one embodiment of the invention to provide an improved data set for automatic identification and characterization of lesions or the like that does not tend to overemphasize the measurement of lesions in areas with high background intensity and vice versa.

The predefined characteristics of the composite patient may be not having a predetermined disease and the composite patient may represent an idealized patient not having the predetermined disease.

It is thus a feature of at least one embodiment of the invention to accentuate abnormal features in an image by removing normal variations of the human body.

The composite patient may represent a composite of at least ten patients having the predefined characteristics.

It is thus a feature of at least one embodiment of the invention to provide a composite to minimize features of the composite patient unrelated to absence of the predetermined disease.

The image registration may first register corresponding rigid bones of the skeleton and then change a dimension of the bones of the skeleton to provide a registration on a bone-by-bone basis.

It is thus a feature of at least one embodiment of the invention to provide an improved registration system that takes full advantage of the rigid nature of bones (by segregating a non-distorting registration as a first step) to provide improved matching of skeleton structures.

In an alternative embodiment, the properties of the patient image data may be measures of bone marrow amount, bone density, bone metabolism, bone lesions or bone turnover, and the parameters of the template image data may be corresponding measures of bone marrow amount, bone density, bone metabolism, bone lesions or bone turnover, for the composite patient and the modification of the patient image data normalizes the patient image data according to these corresponding measures for the composite patient to accentuate deviations in these measures between the patient image data and the template image data.

It is thus a feature of at least one embodiment of the invention to apply the technique of the present invention to a range of skeletal diseases.

In an alternative embodiment, the template image data may describe points in space linked to parameters related to the property of the bone of skeletal structure of a composite patient having predefined characteristics, each template image associated with a disease diagnosis. In this case, the electronic computer executes a stored program to: (a) register the template image data of each template image to the patient image data according to anatomical correspondence; (b) after registration, identify a matching of template image data of each template to patient image data to provide a match value: and (c) output a disease diagnosis associated with at least one template image based on the match value.

It is, thus a feature of at least one embodiment of the invention to provide a method of disease diagnosis or confirmation by matching standardized templates of the skeleton associated with different diseases to a particular patient.

These particular objects and advantages may apply to only some embodiments falling within the claims and thus do not define the scope of the invention.

DETAILED DESCRIPTION OF THE PREFERRED EMBODIMENT

System Hardware

Figure 1:
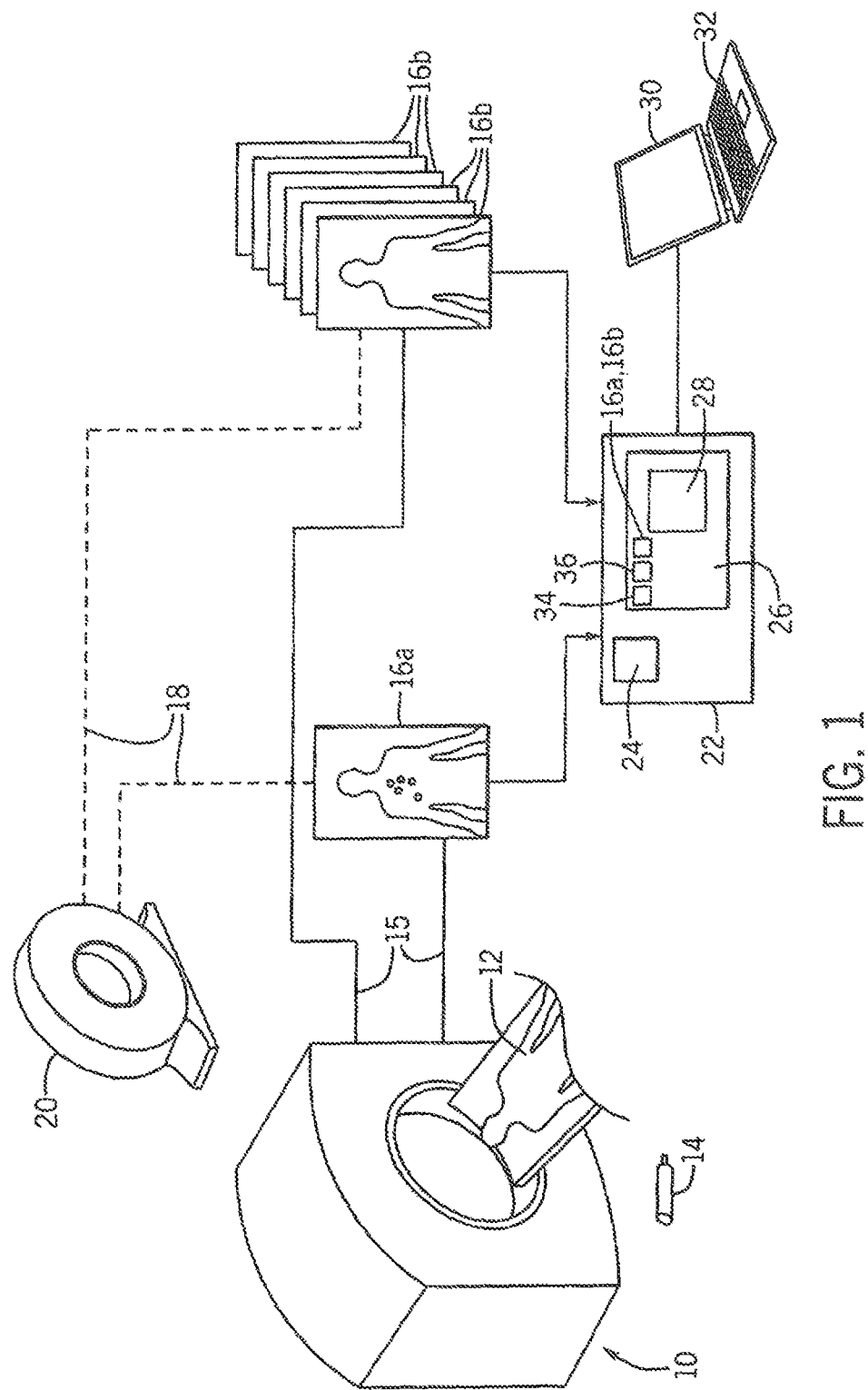
FIG. 1 is a simplified block diagram of the imaging hardware associated with the present invention showing a scanning process for obtaining molecular (e.g., PET) and anatomical (e.g., CT) scans for use in practice of the present invention.

Referring now to FIG. 1, scanner 10 capable of imaging bone disease (for example, "functional imaging" or "metabolic imaging") may scan a patient 12 after an administration to the patient 12 of a molecular imaging agent 14 (e.g., a radioactive tracer). In one embodiment, the molecular imaging agent 14 may be $^{18}$F—NaF.

The scanner 10, in one example, may be a PET (positron emission tomography) scanner. As is generally understood in the art, PET is a nuclear medical imaging technique producing three-dimensional image data comprised of multiple voxels having values revealing functional processes in the body reflected by uptake of the molecular imaging agent 14 to tumor tissue. The molecular imaging agent 14, in this case, may be a positron emitting radionuclide attached to a biologically active molecule; the biologically active molecule being selected to participate in the tumor's metabolism.

The patient 12 may be scanned at multiple times to produce molecular imaging data 15 providing one or more patient scans 16a preferably of the entire body. These patient scans 16a may be taken, for example, before and after sessions of treatment of the patient 12 by chemotherapy, radiation therapy, or the like to assess tumor state and changes in that state. The scans 16a may be supplemented with additional scans by other scanners 20, for example, a conventional kilovoltage or megavoltage CT (computed tomography), MRI (magnetic resonance imaging), or SPECT (single photon emission tomography), such as may provide higher resolution image data 18 presenting anatomical information typically without the metabolic information. Generally, the scans 16a will present measurement data associated with voxel's distributed in three dimensions, although only two dimensions are shown for clarity.

The measurement data of the scans 16a may include the amount of molecular imaging agent 14 per unit volume or other measurable dimensions including but not limited to the amount of bone marrow per unit volume, volumetric blood flow, and other regional chemical composition or absorption parameters.

A population of individuals (not shown) other than the patient 12 may be scanned to produce molecular imaging data 15 providing one or more population scans 16b of the entire body of the individuals in the same orientation as the patient 12. Generally, the individuals subject to the population scans 16b will be selected with respect to having or being free from a particular disease as will be discussed below. In the ease where variations in uptake rate of molecular imaging agents 14 are being considered, each of the individuals in the population scans 16b will have been treated with the same molecular imaging agent 14 as used with the patient 12, for example, as part of a test for a same disease which affects the patient 12 but which, for those individuals, ultimately proves negative. The scans 16b of these individuals will be used to create a template that may be compared to the patient scans 16a to improve analysis of the latter as will be discussed in detail below.

The patient scan 16a and population scans 16b may be received by an electronic computer 22 for processing as will be also described in greater detail below. Generally, the electronic computer 22 includes one or more processing units 24 communicating with a memory 26 holding data and a stored program 28 for effecting portions of the present invention. The memory 26 may also hold a skeleton template 34 and a population template 36, as well as multiple patient scans 16a and population scans 16b to be discussed below.

The computer 22 may communicate with a graphics display 30 for displaying images based on the scans 16a and 16b and may communicate with user input devices 32 such as a keyboard, mouse, or the like, each allowing entry of data by a user. Generally, the graphics display 30 may display output images indicating cancer detection, progression, or regression based on measures of intensity within multiple tumor locations in the patient 12.

Program Operation

Preparation of the Population Template

Figure 2:
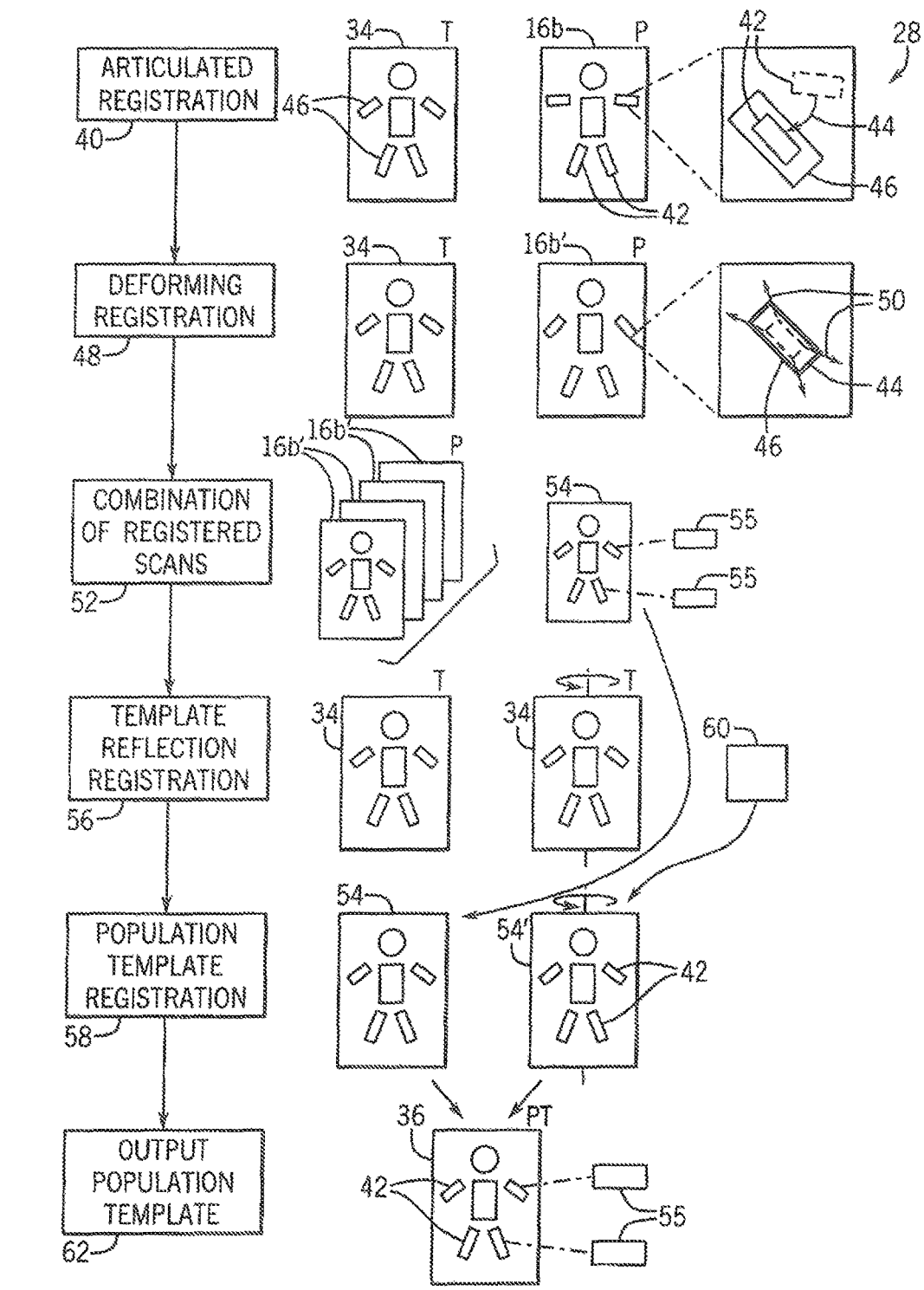
FIG. 2 is a flowchart showing the principal steps in generating an articulable skeleton template used in the present invention.

Referring now also to FIG. 2, the stored program 28 may operate before the patient scan 16a by preparing a population template 36 that will be used to compare to the patient scans 16a. In this regard, the invention employs a stored skeleton template 34, for example, providing volumetric image data of a reference skeleton. This skeleton template 34 will preferably be based on whole body scans of one or more individuals other than the given patient 12, the whole body scans having the same patient orientation as will be used for the patient scans 16a and population scans 16b. Portions of the whole body scans related to the skeleton are isolated by segmentation programs generally known in the art to provide for an isolated skeleton. Atlas-based decomposition is performed on this isolated skeleton to separate the data into individual bones or bony regions such as the pelvis or femur.

At process block 40, the skeleton template 34 is compared to each population scan 16b, the latter also subject to isolation of the skeleton and separation of the data into individual bones or bony regions 42. Typically, each of the skeleton template 34 and the population scans 6b will be more than 10 different bony regions 42. In this comparison process, the bony regions (for example, represented by region 42) of the population scans 16b are first moved in rotation and translation (without distortion) per arrow 44 to match the location and orientation of corresponding bony regions 46 in the skeleton template 34. Such a matching, for example, may align centers of mass of each of the regions 42 and 46 and then rotate the regions 42 and 46 to provide the best match of the data of the scans, for example, highest correlation among measured values (e.g., tracer uptake, bone marrow concentration, etc.). One such technique is the Principle Axis method which aligns principle axes of the portions. The invention contemplates that other rigid alignment methods may be used.

At process block 48, the bony regions 42, as aligned with a corresponding region 46 per process block 40, are then distorted by expansion or contraction (without rotation or translation) shown by arrows 50, again to maximize matching between the regions 42 and 46. This process is done for each region 46 and 42 in the skeleton template 34 and population scan 16b and produces a set of aligned population scans 16b'.

At process block 52, aligned population scans 16b' for multiple individuals are combined (for example, using a pixel-by-pixel averaging) to produce a composite template 54 providing a composite of the individuals of different population scans 16b in the single composite template 54. Typically, this combining process will include more than 10 individuals. The composite template 54 will generally describe multiple regions 42 of the skeleton where each region is linked to one or more parameters 55 derived from that particular region 42. For example, each region 42 of the composite template 54 may provide a parameter indicating average intensity of the molecular imaging agent 14 (or other well understood statistical measures including standard deviation, probability of disease occurrence, etc.), giving an indication of how much intensity of the given molecular imaging agent 14 will typically occur in that region 42 in the absence of disease. These parameters 55 may be bulk values associated with the entire region 42 (differing among regions 42) or may be associated with subregions of the regions 42, for example, providing different intensity regions for proximal and distal ends of the femur, for example. The number and size of the subregions may be flexibly selected according to the particular purpose of the composite template 54.

In order to increase the effective amount of measured data in the composite template 54, optional additional steps of process blocks 56 and 58 may be implemented. In process block 56 the original skeleton template 34 may be registered to a copy of the same skeleton template 34' after that data is flipped about an inferior-superior axis. This operation reflects the fact that the human skeleton is approximately symmetric across the central axis of the skeleton. The registration of skeleton template 34 and the reflected skeleton template 34' may employ the articulated registration of process blocks 40 followed by the deforming registration of process block 48 as described above. The amount of rotation, translation, and expansion of each region of the reflected skeleton template 34' needed to match the skeleton template 34 is stored in a transformation table 60.

At process block 58, the composite template 54 (formed of population scans 16b) is flipped about the central axis of the skeleton to produce reflected composite template 54'. The transformations of transformation table 60 are then applied to the reflected composite template 54'. After that transformation, the composite template 54 and the transformed, reflected composite template 54 are combined, for example, by averaging to produce a final population template 36 having each region 42 tagged by one or more parameters 55 that may be output and stored for use as will be discussed below as indicated by process block 62.

Use of the Population Template for Normalization

Figure 3:
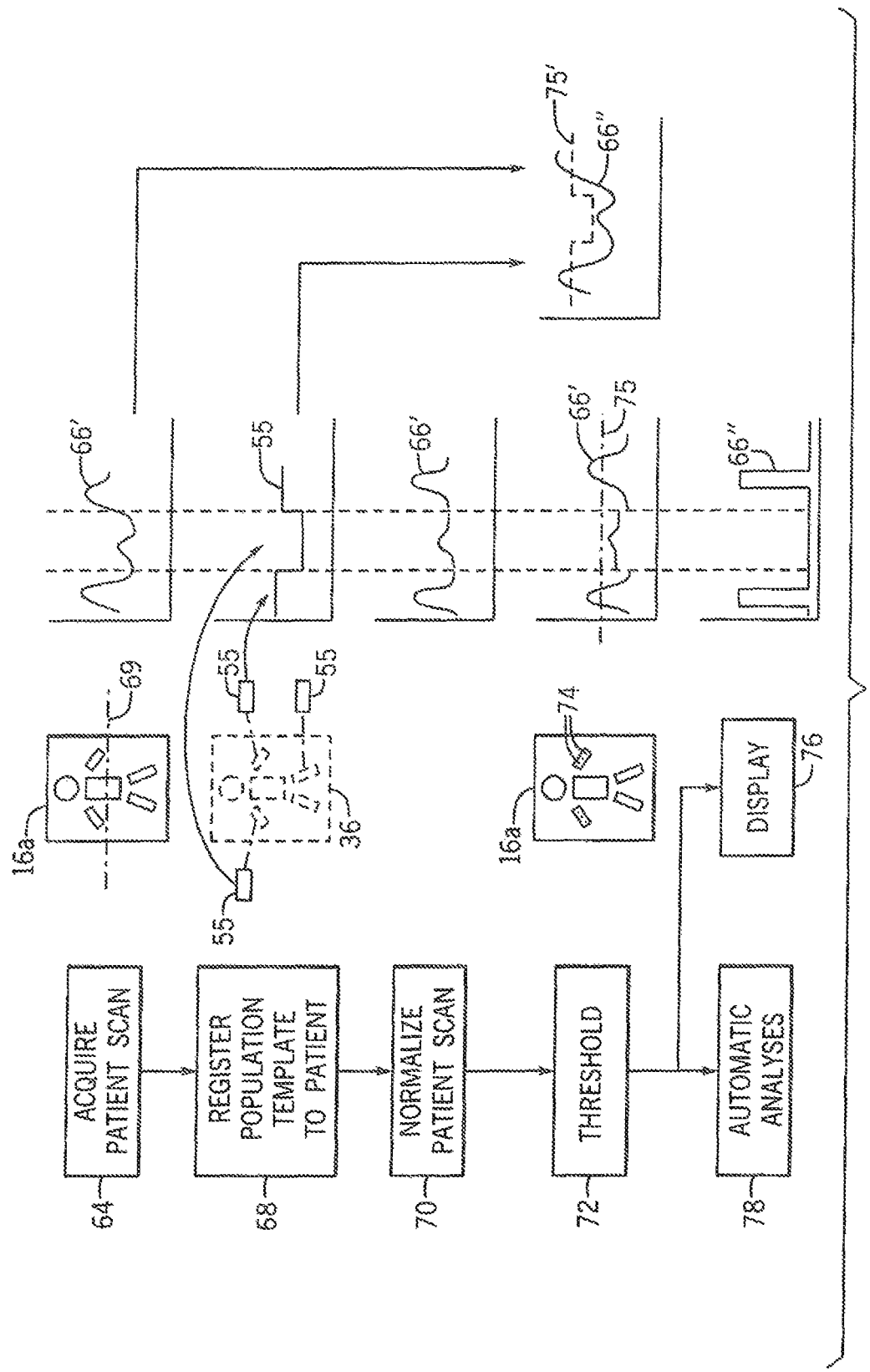
FIG. 3 is a flow chart showing the steps of using the template generated in FIG. 2 for enhancing bone imaging.

Referring now to FIG. 3, a first use of the population template 36 may be to enhance bone images used in the detection of bone disease such as metastasizing cancerous tumors. In this process, the computer 22 (shown in FIG. 1) acquires a patient scan 16a, as indicated at process block 64, using, for example, a combination of PET and CT scanning. Generally, the image data of this patient scan 16a will provide patient measurement values 66 (shown in a single scanline 69 for clarity but typically being three-dimensional data), for example, indicating uptake of the molecular imaging agent 14. These measurement values 66 may be highly influenced by different intensities in normal bone.

At process block 68, the population template 36, prepared as described above, is registered to the patient scan 16a. As noted, the population template 36 is associated with parameters 55, for example, stepwise values, indicating different intensities associated with different regions 42 of the population template 36 derived from measurements of individuals per population scans 16*b*.

At process block 70 the parameters 55 of the population template 36 (indicating variations in intensities of healthy tissue) are used to normalize the measurement values 66 of the patient scan 16*a* to produce normalized measured values 66'. For example, in regions 42 where there are higher uptake rates of the molecular imaging agent 14 in healthy individuals, the measured values 66 of the patient 12 are lowered proportionally, and for regions 42 where there is a lower uptake rate of the molecular imaging agent 14 in healthy individuals, the measured values 66 are raised proportionally (in both cases this may be done, for example, by dividing the measured value 66 by the intensities of the parameters 55 or other similar normalization techniques).

The normalize measurement values 66' may then be output in image form directly or may be modified by a threshold that will now be described. At process block 72, a threshold 75 may be applied to the normalized measured values 66' to provide, for example, a consistent highlighting of lesions 74 in the patient scan 16*a*. For example, a constant threshold of SUV>10 g/mL may be applied to the normalized measured value 66 to create a thresholded value 66" having either a high or low value depending on where the measured value 66 lies with respect to the threshold 75. The thresholded values 66" when displayed provide a highlighting of lesions 74 in the patient scan 16*a* if the intensity is greater than that amount as indicated by process block 76. Other constant threshold values may be applied.

The thresholded values 66" may alternatively be analyzed quantitatively as indicated by process block 78, for example, to determine the number of lesions, an average area, or the like, for example, providing data that may be used in evaluating disease burden per U.S. Pat. No. 9,161,720 issued Oct. 20, 2015, entitled: "System and Method for Evaluation of Disease Burden" and hereby incorporated by reference.

Referring still to FIG. 3, it will be appreciated that the same result may be obtained without weighting of the of the patient measured value 66 by instead weighting the threshold 75 to produce a weighted threshold 75' that may be applied to the unmodified measurement values 66.

This process of enhancing the bone scan may also be used when the measured values 66 are other bone related features such as amount or density of bone marrow, uptakes of other tracer materials, bone density, bone metabolism, bone lesions and bone turnover, disease occurrence, or the like. In this ease, the parameters 55 may be, respectively, normalized amount or density of bone marrow, normalized uptake of other tracer materials, probabilities of disease occurrence, or normalized bone density, bone metabolism, bone lesions or bone turnover, or the like in a normal population.

Use of the Population Template for Disease Diagnosis

Figure 4:
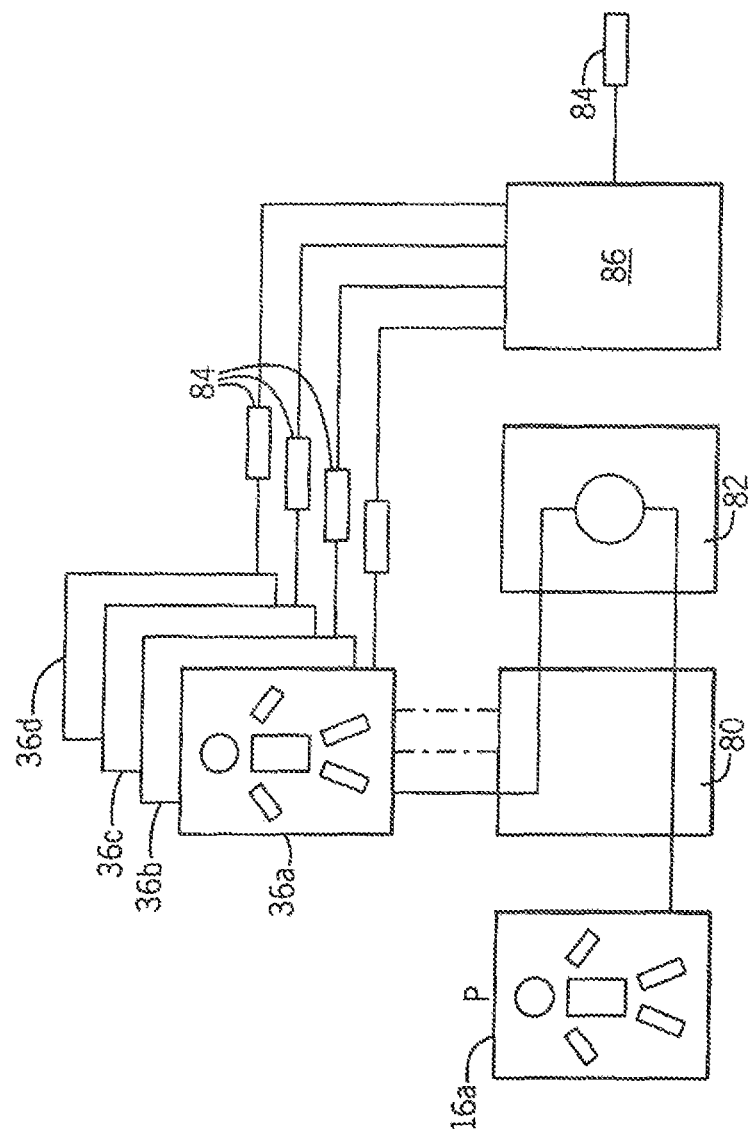
FIG. 4 is a process diagram showing the use of the template system of FIG. 2 for the identification of bone disease.

Referring now to FIG. 4, in an alternative embodiment, multiple population templates 36*a*-36*d* may be prepared not of normal individuals but of individuals identified as having particular medical conditions whose diagnosis is of interest. In this respect, each population template 36 may provide standard normal measured values of individuals having a particular disease diagnosis and may be tagged by that disease with a disease diagnosis tag 84. These population templates 36*a*-36*d* may then be used to provide disease diagnosis as will be described.

In this application, the data of a patient scan 16*a* is received and registered per process block 80 using the steps described above with respect to process blocks 40 and 48 successively with each of the population templates 36*a*-36*d*. Alternatively, it will be appreciated that the population templates 36*a*-36*d* may be registered to the patent scan 16*a*. At process block 82, the match value at that registration (indicating a "goodness" of the match) is then extracted for each population template 36*a*-36*d* separately and provided to a prioritizor 86 which identifies the population template 36*a*-36*d* providing the best match with the registered patient scan 16*a* or which identifies an ordering of the population templates 36*a*-36*d* according to match values. The prioritizor 86 may use the disease diagnosis tag 84 of the population template 36*a*-36*d* having the best matches to indicate a possible diagnosis of the patient 12 or a ranking of possible diagnoses. Alternatively, the prioritizor 86 may use statistical parametric mapping where statistical deviation from the normal population template is quantified per voxel or cluster (e.g., z-score).

Using templates 36 of this kind, disease diagnosis may be assisted through a matching process.

It will be appreciated, in this latter regard, that each of the population templates 36*a*-36*d* may provide multiple dimensions of measured value 66, for example, providing both molecular imaging agent 14 uptake values, bone marrow values, bone density values, bone metabolism, bone lesions and bone turnover, and the like and that the matching process may consider each of these dimensions together to provide a best match.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A medical imaging system comprising:
   patient image computer data storage holding patient image data of a skeletal structure of a patient, the patient image data describing points in space linked to properties of hone of the skeletal structure at those points;
   template skeleton computer data storage holding template image data corresponding anatomically to the patient skeletal structure, the template image data describing points in space linked to parameters related to a property of bone of skeletal structure of a composite patient having predefined characteristics; and
   an electronic computer executing a stored program to:
   (a) register the template image data to the patient image data according to anatomical correspondence;
   (b) modify the patient image data using the template image data to accentuate features in the patient image data reflecting differences between the skeletal structure of the patient and the skeletal structure of the composite patient; and
   (c) display the modified patient image data accentuating differences between the skeletal structure of the patient and the skeletal structure of the composite patient having predetermined characteristics.

2. The medical imaging system of claim 1 wherein the modification of the patient image data is selected from the group consisting of: applying the parameters of the template image data as weighting factors to the patient image data and applying the parameters of the template image data in determining detection thresholds applied to the patient image data.

3. The medical imaging system of claim 1 wherein the properties of the patient image data are measures of radioactive tracer uptake and wherein the parameters of the template image data are functions of differences in uptake rate of radioactive tracers in the skeleton.

4. The medical imaging system of claim 1 wherein different bones of the skeletal structure of the composite patient provide different parameter values.

5. The medical imaging system of claim 1 wherein the template image data provides at least ten different parameter values.

6. The medical imaging system of claim 1 wherein the electronic computer further executes the stored program to identify at least one of number and size of lesions in the modified patient image data base.

7. The medical imaging system of claim 1 wherein the predefined characteristics are not having a predetermined disease and the composite patient represents an idealized patient not having the predetermined disease.

8. The medical imaging system of claim 1 wherein the composite patient represents a composite of at least ten patients having the predefined characteristics.

9. The medical imaging system of claim 1 wherein the registration first registers corresponding rigid bones of thy skeleton and then changes a dimension of the bones of the skeleton to provide a registration on a bone-by-bone basis.

10. The medical imaging system of claim 1 further including a medical imaging machine producing the patient image data and selected from the group consisting of an MRI machine, a PET scanner, a CT scanner, and a gamma camera.

11. The medical imaging system of claim 1 wherein the properties of the patient image data are measures of bone marrow amount and wherein the parameters of the template image data are bone marrow amount for the composite patient and wherein the modification of the patient image data normalizes the patient image data according to the bone marrow amount for the composite patient to accentuate deviations in hone marrow amount between the patient image data and the template image data.

12. The medical imaging system of claim 1 wherein the properties of the patient image data are measures selected from the group consisting of bone density, bone metabolism, bone lesions and bone turnover, and wherein the parameters of the template image data are selected from the group consisting of bone density, bone metabolism, bone lesions and bone turnover for the composite patient and wherein the modification of the patient image data normalizes the patient image data according to corresponding measures of the bone density, bone metabolism, bone lesions and bone turnover, of the composite patient to accentuate deviations in the corresponding measures of bone density, bone metabolism, bone lesions and bone turnover, amount between the patient image data and the template image data.

13. A method of analyzing skeletal images using a medical imaging system including:
   patient image computer data storage holding patient image data of a skeletal structure of a patient, the patient image data describing points in space linked to properties of bone of the skeletal structure at those points;
   template skeleton computer data storage holding template image data of an atomically corresponding structure to the patient skeletal structure, the template image data describing points in space linked to parameters related to a property of bone of a skeletal structure of a composite patient having predefined characteristics; and
   an electronic computer executing a stored program to:
   register the template image data to the patient image data according to anatomical structures;
   modify the patient image data to accentuate differences between the patient image data and template image data of corresponding points in the registered template image data and patient image data; and
   display the modified skeleton data accentuating differences between the skeletal structure of the patient and the skeletal structure of the composite patient having predetermined characteristics; the method comprising the steps of:
   (a) obtaining patient image data of the skeletal structure of a patient for storage in the patient image computer data storage;
   (b) creating template image data by combining patient image data of multiple patients having a common predefined characteristic for storage in the template skeleton computer data storage; and employing the medical imaging system to:

(c) register the template image data to the patient image data according to anatomical structures;

(d) modify the patient image data using the template image data to accentuate features in the patient image data reflecting differences between the skeletal structure of the patient and the skeletal structure of the composite patient; and (e) display the modified patient image data accentuating differences between the skeletal structure of the patient and the skeletal structure of the composite patient having predetermined characteristics.

14. The method of claim 13 wherein the properties of the patient image data are measures of radioactive tracer uptake and wherein the parameters of the template image data are thresholds of radioactive tracer uptake defining a level of radioactive tracer uptake required for display in the modified patient image data.

15. The method of claim 14 wherein the template image data provides at least ten different uptake rates.

16. The method of claim 13 wherein, the composite patient represents a composite of at least ten patients having the predefined characteristics.

17. The method of claim 13 including the step of having a healthcare professional review patient image data associated with each of the patients to identify lesions and determining a threshold measure of radioactive tracer uptake best identifying the lesions and wherein the electronic computer further executes the stored program to apply the threshold to the modified patient data to identify lesions based on tracer uptake as modified by uptake rates of the template image data.

18. The method of claim 13 wherein, the properties of the patient image data are measures of bone marrow amount and wherein the parameters of the template image data are bone marrow amount for the composite patient and wherein the modification of the patient image data normalizes the patient image data according to the bone marrow amount for the composite patient to accentuate deviations in bone marrow amount between the patient image data and the template image data.

19. The method of claim 13 wherein the properties of the patient image data are measures of bone density and wherein the parameters of the template image data are bone density for the composite patient and wherein the modification of the patient image data normalizes the patient image data according to the bone density of the composite patient to accentuate deviations in bone density amount between the patient image data and the template image data.

20. A medical imaging system comprising:

patient image computer data storage holding patient image data of a skeletal structure of a patient, the patient image data describing points in space linked to properties of bone of the skeletal structure at those points;

a template skeleton computer data storage holding multiple template images of template image data corresponding anatomically to the patient skeletal structure, the template image data describing points in space linked to parameters related to a property of bone of the skeletal structure of a composite patient having predefined characteristics, each template image associated with a disease diagnosis; and an electronic computer executing a stored program to:

(a) register the template image data of each template image to the patient image data according to anatomical correspondence;

(b) after registration, identify a matching of template image data of each template to patient image data to provide a match value; and (c) output a disease diagnosis associated with at least one template image based on the match value.

* * * * *